United States Patent
Yang et al.

(10) Patent No.: US 11,567,995 B2
(45) Date of Patent: Jan. 31, 2023

(54) BRANCH THREADING IN GRAPH DATABASES

(71) Applicant: Microsoft Technology Licensing, LLC, Redmond, WA (US)

(72) Inventors: Yiming Yang, Fremont, CA (US); Andrew Rodriguez, Palo Alto, CA (US); Andrew J. Carter, Mountain View, CA (US); Scott M. Meyer, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 650 days.

(21) Appl. No.: 16/523,095

(22) Filed: Jul. 26, 2019

(65) Prior Publication Data

US 2021/0026894 A1    Jan. 28, 2021

(51) Int. Cl.
G06F 16/903    (2019.01)
G06F 16/901    (2019.01)

(52) U.S. Cl.
CPC ........ G06F 16/9024 (2019.01); G06F 16/903 (2019.01)

(58) Field of Classification Search
CPC ........................... G06F 16/9024; G06F 16/903
USPC ....................................................... 707/798
See application file for complete search history.

(56) References Cited

U.S. PATENT DOCUMENTS

| | | | |
|---|---|---|---|
| 7,376,639 B2 | 5/2008 | Kutsch et al. | |
| 8,185,558 B1 | 5/2012 | Narayanan et al. | |
| 8,527,497 B2 | 9/2013 | Singh et al. | |
| 8,533,182 B1 | 9/2013 | Charboneau | |
| 8,736,612 B1 * | 5/2014 | Goldman | G06F 16/951 345/440 |
| 9,189,520 B2 | 11/2015 | May et al. | |
| 9,292,570 B2 | 3/2016 | Sargeant et al. | |
| 9,330,138 B1 * | 5/2016 | Shankar | G06F 16/282 |
| 9,372,891 B2 | 6/2016 | Nguyen et al. | |

(Continued)

FOREIGN PATENT DOCUMENTS

| | | |
|---|---|---|
| EP | 2937797 A1 | 10/2015 |
| WO | 2012091844 A1 | 7/2012 |

OTHER PUBLICATIONS

"Delta Encoding", Retrieved from: https://en.wikipedia.org/w/index.php?title=Delta_encoding&oldid=773485464, Retrieved Date: Apr. 10, 2017, 4 Pages.

(Continued)

*Primary Examiner* — Hicham Skhoun
(74) *Attorney, Agent, or Firm* — Nicholson De Vos Webster & Elliott LLP

(57) ABSTRACT

The disclosed embodiments provide a system for processing queries of a graph database storing a graph, wherein the graph comprises a set of edges defined by a first linkage, a second linkage, and a third linkage. During operation, the system maintains the base version of an index of the graph database. Upon branching a version of the graph database from a first offset representing a virtual time in the base version of the graph database, the system creates a branched version of the index from a second offset corresponding to the virtual time in the base version of the index. The system then processes queries of the graph database based on the offsets and references from the branched version of the index to the base version of the index.

21 Claims, 9 Drawing Sheets

(56) References Cited

U.S. PATENT DOCUMENTS

| | | | |
|---|---|---|---|
| 9,378,303 | B1 | 6/2016 | Shankar et al. |
| 9,495,427 | B2 | 11/2016 | Abadi et al. |
| 9,535,963 | B1* | 1/2017 | Shankar ............... G06F 16/2433 |
| 2003/0084043 | A1 | 5/2003 | Acharya et al. |
| 2006/0036564 | A1 | 2/2006 | Yan et al. |
| 2007/0192306 | A1 | 8/2007 | Papakonstantinou et al. |
| 2007/0239694 | A1 | 10/2007 | Singh et al. |
| 2008/0116449 | A1 | 5/2008 | Macready et al. |
| 2008/0306910 | A1 | 12/2008 | Singh |
| 2009/0132503 | A1 | 5/2009 | Sun et al. |
| 2009/0240649 | A1 | 9/2009 | Sereni et al. |
| 2009/0240682 | A1 | 9/2009 | Balmin et al. |
| 2011/0270861 | A1 | 11/2011 | Arshavsky et al. |
| 2011/0276781 | A1 | 11/2011 | Sengupta et al. |
| 2012/0005224 | A1 | 1/2012 | Ahrens et al. |
| 2012/0047114 | A1* | 2/2012 | Duan ............... G06F 16/24534 707/694 |
| 2012/0054129 | A1 | 3/2012 | Aggarwal |
| 2012/0096043 | A1 | 4/2012 | Stevens, Jr. |
| 2012/0136884 | A1 | 5/2012 | Kanawa |
| 2012/0179644 | A1 | 7/2012 | Miranker |
| 2012/0284255 | A1 | 11/2012 | Schechter et al. |
| 2013/0091122 | A1 | 4/2013 | Saleh et al. |
| 2013/0097180 | A1 | 4/2013 | Tseng |
| 2014/0156632 | A1 | 6/2014 | Yu et al. |
| 2014/0172914 | A1* | 6/2014 | Elnikety ............ G06F 16/9024 707/774 |
| 2014/0195564 | A1* | 7/2014 | Talagala ............ G06F 11/141 707/802 |
| 2014/0201234 | A1 | 7/2014 | Lee et al. |
| 2014/0280044 | A1* | 9/2014 | Huynh ............ G06F 16/24578 707/722 |
| 2014/0310302 | A1* | 10/2014 | Wu .................. G06F 16/532 707/769 |
| 2014/0330867 | A1 | 11/2014 | Sarkar et al. |
| 2014/0337373 | A1* | 11/2014 | Morsi ............... G06F 16/245 707/769 |
| 2015/0012523 | A1 | 1/2015 | Dey et al. |
| 2015/0026158 | A1 | 1/2015 | Jin |
| 2015/0052134 | A1 | 2/2015 | Bomea et al. |
| 2015/0120717 | A1 | 4/2015 | Kim et al. |
| 2015/0120775 | A1* | 4/2015 | Shao ............... G06F 16/2456 707/769 |
| 2015/0127677 | A1* | 5/2015 | Wang ............... G06F 16/245 707/769 |
| 2015/0134637 | A1* | 5/2015 | Pall ................ G06F 16/9024 707/718 |
| 2015/0149435 | A1 | 5/2015 | Mckenna et al. |
| 2015/0169686 | A1 | 6/2015 | Elias et al. |
| 2015/0234888 | A1 | 8/2015 | Ahmed et al. |
| 2015/0302300 | A1* | 10/2015 | Fletcher ............... G06N 5/04 706/11 |
| 2016/0071233 | A1* | 3/2016 | Macko ............... G06T 11/206 345/440 |
| 2016/0171540 | A1 | 6/2016 | Mangipudi et al. |
| 2016/0188594 | A1 | 6/2016 | Ranganathan |
| 2016/0246842 | A1 | 8/2016 | Li et al. |
| 2016/0260011 | A1 | 9/2016 | Corvinelli et al. |
| 2016/0275177 | A1 | 9/2016 | Yin et al. |
| 2016/0314220 | A1* | 10/2016 | Sachdev ............... G06F 16/86 |
| 2017/0010968 | A1 | 1/2017 | Li et al. |
| 2017/0212945 | A1* | 7/2017 | Shankar ............... G06F 16/2358 |
| 2018/0089331 | A1* | 3/2018 | Long ................ G06F 16/2455 |
| 2018/0144060 | A1* | 5/2018 | Carter ............... G06F 16/90335 |
| 2018/0144061 | A1* | 5/2018 | Rodriguez ........ G06F 16/90335 |
| 2018/0349443 | A1* | 12/2018 | Carter ................ G06F 16/245 |
| 2019/0005072 | A1* | 1/2019 | Kvalnes ............ G06F 16/288 |

OTHER PUBLICATIONS

"Non Final Office Action Issued in U.S. Appl. No. 15/003,527", dated Jun. 21, 2018, 10 Pages.

"Non Final Office Action Issued in U.S. Appl. No. 15/003,527", dated Feb. 7, 2018, 8 Pages.

"Non Final Office Action Issued in U.S. Appl. No. 15/360,605", dated Oct. 17, 2018, 19 Pages.

Blandford, et al., "An Experimental Analysis of a Compact Graph Representation", In Proceedings of Sixth Workshop on Algorithm Engineering and Experiments, Jan. 10, 2004, 14 Pages.

Dean, Jeff, "Challenges in Building Large-Scale Information Retrieval Systems", In Proceedings of the Second International Conference on Web Search and Web Data Mining, Feb. 9, 2009, 77 Pages.

Koszewnik, Drew, "The Netflix Tech Blog: NetflixGraph Metadata Library: An Optimization Case Study", Retrieved from: https://netflixtechblog.com/netflixgraph-metadata-library-an-optimization-case-study-6cc7d5eb2946, Jan. 18, 2013, 10 Pages.

Lemire, et al., "Decoding Billions of Integers Per Second through Vectorization", In Journal of Software- Practice and Experience, vol. 45, Issue 1, Jan. 1, 2015, 29 Pages.

Ousterhout, et al., "The RAMCloud Storage System", In Journal of ACM Transactions on Computer Systems, vol. 33, Issue 3, Aug. 2015, 55 Pages.

"International Search Report and Written Opinion Issued in PCT Application No. PCT/US2016/068119", dated Aug. 18, 2017, 11 Pages.

Prabhakaran, et al., "Managing Large Graphs on Multi-Cores With Graph Awareness", In Proceedings of the USENIX Annual Technical Conference, Jun. 13, 2012, 12 Pages.

Shao, et al., "Trinity: A Distributed Graph Engine on a Memory Cloud", In Proceedings of the ACM SIGMOD International Conference on Management of Data, Jun. 22, 2013, pp. 505-516.

Stepanov, et al., "SIMD-Based Decoding of Posting Lists", In Proceedings of the 20th ACM Conference on Information and Knowledge Management, Oct. 24, 2011, 10 Pages.

Williams, et al., "Graph Database Indexing Using Structured Graph Decomposition", In Proceedings of 23rd International Conference on Data Engineering, Apr. 15, 2007, pp. 976-985.

Zou, et al., "Summarization Graph Indexing: Beyond Frequent Structure-Based Approach", In Proceedings of 13th International Conference on Database Systems for Advanced Applications, Mar. 19, 2008, 16 Pages.

* cited by examiner

BRANCH THREADING IN GRAPH DATABASES

BACKGROUND

Field

The disclosed embodiments relate to graph databases. More specifically, the disclosed embodiments relate to branch threading in graph databases.

Related Art

Data associated with applications is often organized and stored in databases. For example, in a relational database data is organized based on a relational model into one or more tables of rows and columns, in which the rows represent instances of types of data entities and the columns represent associated values. Information can be extracted from a relational database using queries expressed in a Structured Query Language (SQL).

In principle, by linking or associating the rows in different tables, complicated relationships can be represented in a relational database. In practice, extracting such complicated relationships usually entails performing a set of queries and then determining the intersection of the results or joining the results. In general, by leveraging knowledge of the underlying relational model, the set of queries can be identified and then performed in an optimal manner However, applications often do not know the relational model in a relational database. Instead, from an application perspective, data is usually viewed as a hierarchy of objects in memory with associated pointers. Consequently, many applications generate queries in a piecemeal manner, which can make it difficult to identify or perform a set of queries on a relational database in an optimal manner. This can degrade performance and the user experience when using applications.

Various approaches have been used in an attempt to address this problem, including using an object-relational mapper, so that an application effectively has an understanding or knowledge about the relational model in a relational database. However, it is often difficult to generate and to maintain the object-relational mapper, especially for large, real-time applications.

Alternatively, a key-value store (such as a NoSQL database) may be used instead of a relational database. A key-value store may include a collection of objects or records and associated fields with values of the records. Data in a key-value store may be stored or retrieved using a key that uniquely identifies a record. By avoiding the use of a predefined relational model, a key-value store may allow applications to access data as objects in memory with associated pointers (i.e., in a manner consistent with the application's perspective). However, the absence of a relational model means that it can be difficult to optimize a key-value store. Consequently, it can also be difficult to extract complicated relationships from a key-value store (e.g., it may require multiple queries), which can also degrade performance and the user experience when using applications.

BRIEF DESCRIPTION OF THE FIGURES

In the figures, like reference numerals refer to the same figure elements.

DETAILED DESCRIPTION

Figure 1:
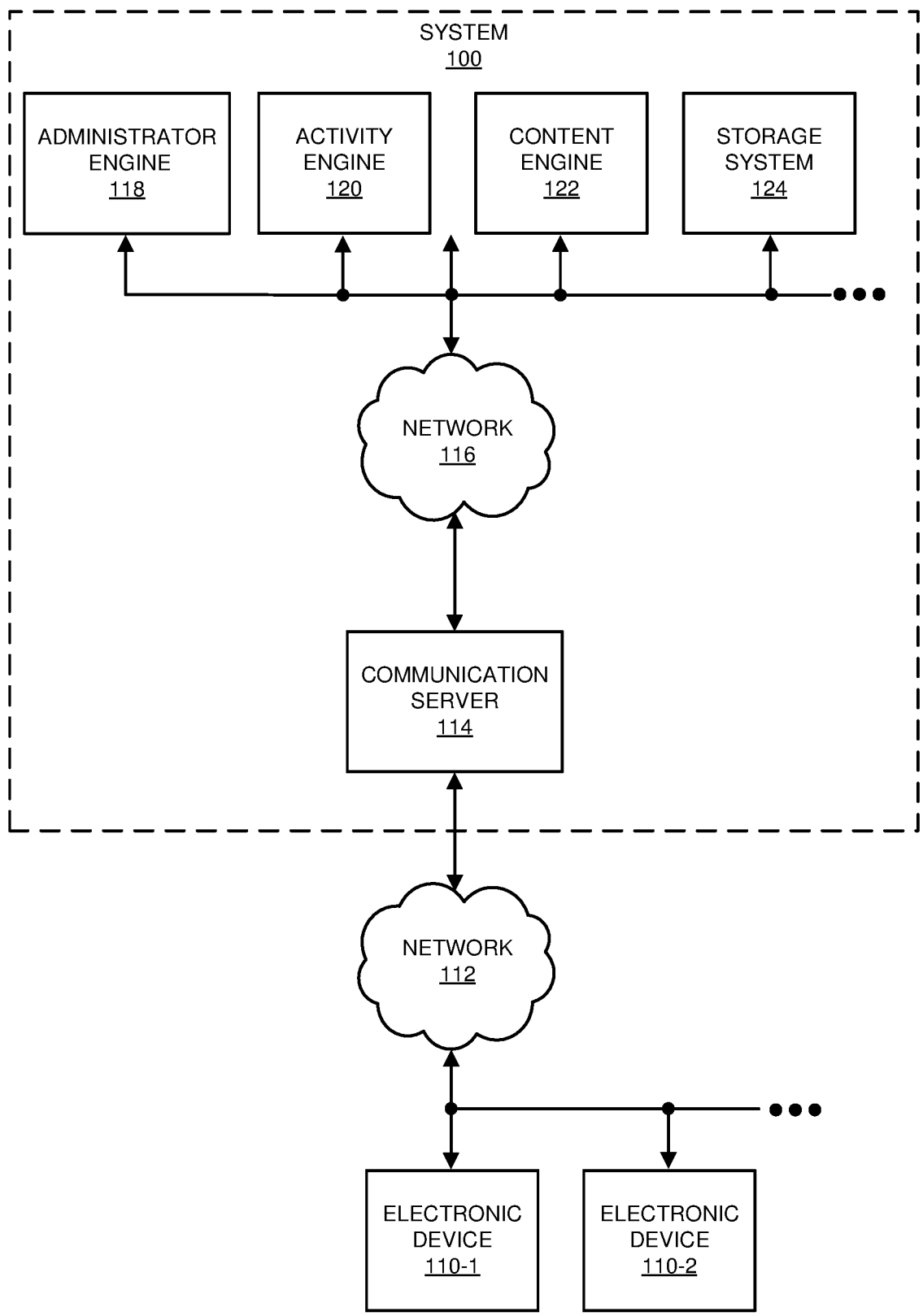
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for processing queries of a graph database. In these embodiments, a graph database stores a graph that includes a set of nodes and edges between pairs of the nodes. For example, nodes in the graph represent members, organizations, locations, jobs, content, and/or other entities in an online network. Edges between the nodes represent relationships and/or interactions between the corresponding entities, such as connections between pairs of members, education of members at schools, employment of members at companies, following of a member or company by another member, business relationships and/or partnerships between organizations, residence of members at locations, creating or sharing articles or posts, sending and receiving messages, sending or accepting connection requests, endorsements or recommendations between members, reviews by the members, applying to opportunities, joining groups, and/or following other entities.

In some embodiments, each edge between two nodes is represented in the graph database as a first linkage, a second, linkage, and a third linkage. For example, each edge in the graph database is specified in a (subject, predicate, object) triple, with the subject and object denoting nodes in the graph database and the predicate denoting the type of edge between the nodes. Thus, an edge with a subject of "Alice," a predicate of "connected to," and an object of "Bob" represents a connection between two members named "Alice" and "Bob" in an online network.

More specifically, the disclosed embodiments provide a method, apparatus, and system for performing branch threading in graph databases. In some embodiments, multiple versions of a graph database are represented using a tree-based structure. The structure includes a base version or "trunk," as well as one or more child versions that "branch" off the base version and/or other child versions. When data (e.g., nodes, edges, predicates, etc.) is written to a branched version of the graph database, the data is stored in a set of structures for the branched version, which is separate from a corresponding set of structures for the base version from which the branched version was created. These structures include a log containing a sequence of changes in the graph, with each change represented by an offset in the log that denotes a virtual time in the graph. The structures also include an index that expedites lookup of edges in the graph by subject, predicate, object, and/or other keys. The index includes one or more hash maps that store mappings of the keys to offsets into an edge store. The edge store includes a number of linkage structures that store additional linkage values that can be used to resolve edges associated with the keys in the hash maps.

When a version of the graph database is branched off a given offset in the log of a base version of the graph database, the offset in the log is stored as a representation of the virtual time at which the branched version was created. Offsets of the hash maps and linkage structures corresponding to the virtual time in the base version of the index are similarly stored to indicate the boundary between data in the base version that can be read by the branched version and data written the base version after creation of the branched version, which cannot be read by the branched version.

To allow lookup of data in a branched version of the graph database, references are stored between linkage structures in the edge store in the branched version and the corresponding linkage structures in the base version of the graph database from which the branched version was created. For example, the base version of the graph database index includes a key in a hash map that maps to one or more linkage structures in the edge store that store remaining linkages for edges that are partially defined by the key. When a version of the graph database is subsequently branched off the base version and a new edge that includes the key is written to the branched version, a new entry for the key is created in a hash map for the branched version. The entry is updated with a mapping of the key to one or more linkage structures in the edge store for the branched version, and additional linkages that are used to resolve the edge are stored in the linkage structure(s). Each linkage structure is additionally updated to include a reference to the corresponding linkage structure in the base version of the edge store, so that subsequent reads of edges associated with the key in the branched version are able to access edges that were written to the graph database in the base version before the branched version was created.

As a result, branched versions of the graph database represent variants or alternative versions of the graph that can be created, modified, and/or deleted without affecting the corresponding base versions. In turn, the branched versions can be used to perform and validate writes to the graph database before merging the writes into the base version, which improves the integrity of data in the graph database and allows the validated writes to be applied in an atomic and consistent manner The branched versions can also be used to test changes to the data, schema, and/or querying of the graph database without modifying a source of truth for the graph in the base versions, which reduces risk, potential for errors or failures, and/or processing overhead associated with conventional techniques that deploy changes to the schema, data, and/or querying in databases without testing or validating the changes first. Moreover, storing a single copy of data in a base version and using the data to perform reads of a version that is branched off the base version reduces the use of storage and/or memory resources in the graph database. Consequently, the disclosed embodiments provide technological improvements in applications, tools, computer systems, and/or environments for storing, querying, duplicating, testing, validating, creating, and/or modifying data and/or databases.

Branch Threading in Graph Databases

FIG. 1 shows a schematic of a system 100 in accordance with the disclosed embodiments. In this system, users of electronic devices 110 use a service that is provided, at least in part, using one or more software products or applications executing in system 100. As described further below, the applications are executed by engines in system 100.

Moreover, the service is provided, at least in part, using instances of a software application that is resident on and that executes on electronic devices 110. In some implementations, the users interact with a web page that is provided by communication server 114 via network 112, and which is rendered by web browsers on electronic devices 110. For example, at least a portion of the software application executing on electronic devices 110 includes an application tool that is embedded in the web page, and that executes in a virtual environment of the web browsers. Thus, the application tool is provided to the users via a client-server architecture.

The software application operated by the users includes a standalone application or a portion of another application that is resident on and that executes on electronic devices 110 (such as a software application that is provided by communication server 114 or that is installed on and that executes on electronic devices 110).

A wide variety of services can be provided using system 100. In the discussion that follows, a social network (and, more generally, a user community), such as an online professional network, which facilitates interactions among the users, is used as an illustrative example. Moreover, using one of electronic devices 110 (such as electronic device 110-1) as an illustrative example, a user of an electronic device uses the software application and one or more of the applications executed by engines in system 100 to interact with other users in the social network. For example, administrator engine 118 handles user accounts and user profiles, activity engine 120 tracks and aggregate user behaviors over time in the social network, content engine 122 receives user-provided content (audio, video, text, graphics, multimedia content, verbal, written, and/or recorded information) and provides documents (such as presentations, spreadsheets, word-processing documents, web pages, etc.) to users, and storage system 124 maintains data structures in a computer-readable memory that encompasses multiple devices, i.e., a large-scale storage system.

Note that each of the users of the social network have an associated user profile that includes personal and professional characteristics and experiences, which are sometimes collectively referred to as 'attributes' or 'characteristics.' For example, a user profile includes: demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors include: log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network.

Furthermore, the interactions among the users help define a social graph in which nodes correspond to the users and edges between the nodes correspond to the users' interactions, interrelationships, and/or connections. However, as described further below, the nodes in the graph stored in the graph database can correspond to additional or different information than the members of the social network (such as users, companies, etc.). For example, the nodes may correspond to attributes, properties or characteristics of the users.

It can be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner.

For example, when an application requests data associated with a complicated relationship (which may involve two or more edges, and which is sometimes referred to as a 'compound relationship'), a set of queries are performed and then the results may be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results can, therefore, be time-consuming. This degraded performance can degrade the user experience when using the applications and/or the social network.

In order to address these problems, storage system 124 includes a graph database that stores a graph (e.g., as part of an information-storage-and-retrieval system or engine). Note that the graph allows an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
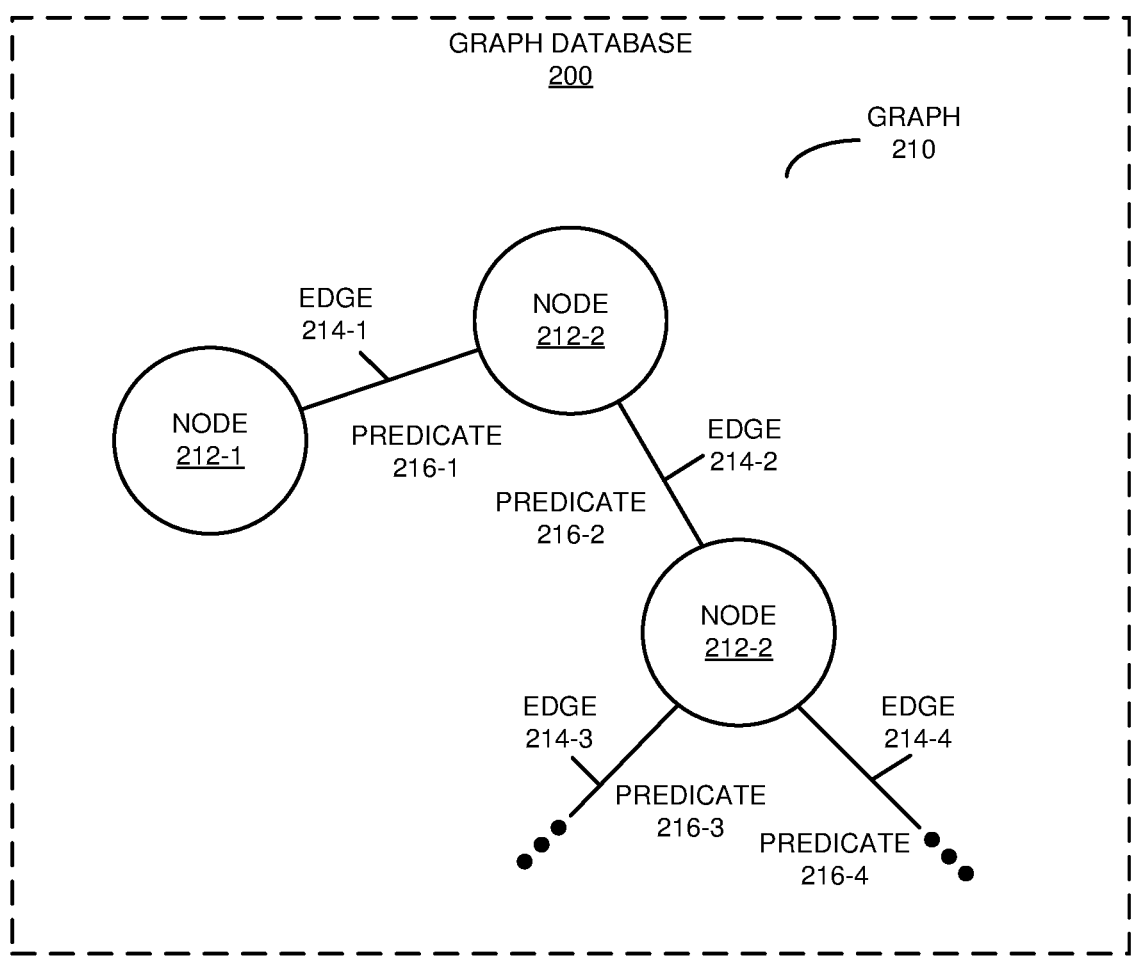
FIG. 2 shows a graph in a graph database in accordance with the disclosed embodiments.

FIG. 2 presents a block diagram illustrating a graph 210 stored in a graph database 200 in system 100 (FIG. 1). Graph 210 includes nodes 212 and edges 214 between nodes 212 to represent and store the data with index-free adjacency, i.e., so that each node 212 in graph 210 includes a direct edge to its adjacent nodes without using an index lookup.

In one or more embodiments, graph database 200 includes an implementation of a relational model with constant-time navigation, i.e., independent of the size N, as opposed to varying as log(N). Moreover, all the relationships in graph database 200 are first class (i.e., equal). In contrast, in a relational database, rows in a table may be first class, but a relationship that involves joining tables may be second class. Furthermore, a schema change in graph database 200 (such as the equivalent to adding or deleting a column in a relational database) is performed with constant time (in a relational database, changing the schema can be problematic because it is often embedded in associated applications). Additionally, for graph database 200, the result of a query includes a subset of graph 210 that preserves the structure (i.e., nodes, edges) of the subset of graph 210.

The graph-storage technique includes embodiments of methods that allow the data associated with the applications and/or the social network to be efficiently stored and retrieved from graph database 200. Such methods are described in U.S. Pat. No. 9,535,963 (issued 3 Jan. 2017), entitled "Graph-Based Queries," which is incorporated herein by reference.

Referring back to FIG. 1, the graph-storage techniques described herein allow system 100 to efficiently and quickly (e.g., optimally) store and retrieve data associated with the applications and the social network without requiring the applications to have knowledge of a relational model implemented in graph database 200. Consequently, the graph-storage techniques improve the availability and the performance or functioning of the applications, the social network and system 100, which reduce user frustration and improve the user experience. Therefore, the graph-storage techniques further increase engagement with or use of the social network and, in turn, the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 3:
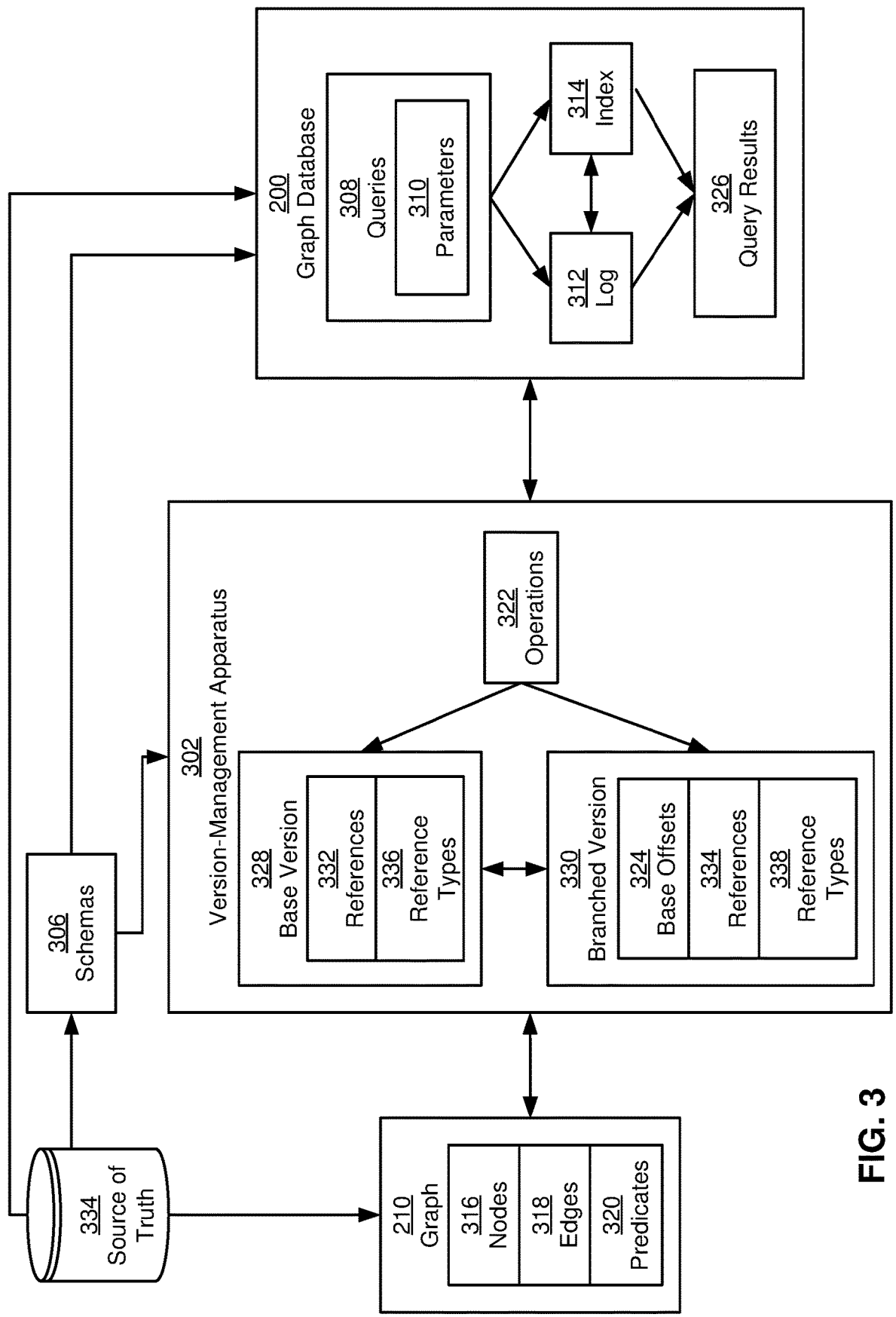
FIG. 3 shows a system for processing queries of a graph database in accordance with the disclosed embodiments.

In one or more embodiments, graph database 200 includes functionality to process queries using a base version of graph database 200 and/or one or more versions that are branched off the base version or other branched versions. As shown in FIG. 3, graph 210 and one or more schemas 306 associated with graph 210 are obtained from a source of truth 334 for graph database 200. For example, graph 210 and schemas 306 may be retrieved from a relational database, distributed filesystem, and/or other storage mechanism providing the source of truth.

As mentioned above, graph 210 includes a set of nodes 316, a set of edges 318 between pairs of nodes 316, and a set of predicates 320 describing the nodes and/or edges. Each edge in graph 210 may be specified in a (subject, predicate, object) triple. Each component of the triple (i.e., subject, predicate, and object) denotes a separate "linkage" that partially defines the edge.

For example, an edge denoting a connection between two members named "Alice" and "Bob" may be specified using the following statement:

Edge("Alice", "ConnectedTo", "Bob").

In the above statement, "Alice" is the subject, "Bob" is the object, and "ConnectedTo" is the predicate. A period following the "Edge" statement may denote an assertion that is used to write the edge to graph database 200. Conversely, the period may be replaced with a question mark to read any edges that match the subject, predicate, and object from the graph database:

Edge("Alice", "ConnectedTo", "Bob")?

Moreover, a subsequent statement may modify the initial statement with a tilde to indicate deletion of the edge from graph database 200:

Edge~("Alice", "ConnectedTo", "Bob").

In addition, specific types of edges and/or complex relationships in graph 210 are defined using schemas 306. Continuing with the previous example, a schema for employment of a member at a position within a company is defined using the following:

```
DefPred("employ/company", "1", "node", "0", "node").
DefPred("employ/member", "1", " node", "0", "node").
DefPred("employ/start", "1", "node", "0", "date").
DefPred("employ/end_date", "1", "node", "0",
    "date").
M2C@(e, memberId, companyId, start, end) :-
    Edge(e, "employ/member", memberId),
    Edge(e, "employ/company", companyId),
    Edge(e, "employ/start", start),
    Edge(e, "employ/end_date", end)
```

In the above schema, a compound structure for the employment is denoted by the "@" symbol and has a compound type of "M2C." The compound is represented by four predicates and followed by a rule with four edges that use the predicates. The predicates include a first predicate representing the employment at the company (e.g., "employ/company"), a second predicate representing employment of the member (e.g., "employ/member"), a third predicate representing a start date of the employment (e.g., "employ/start"), and a fourth predicate representing an end date of the employment (e.g., "employ/end_date"). Each predicate is defined using a corresponding "DefPred" call; the first argument to the call represents the name of the predicate, the second argument of the call represents the cardinality of the subject associated with the edge, the third argument of the call represents the type of subject associated with the edge, the fourth argument represents the cardinality of the object associated with the edge, and the fifth argument represents the type of object associated with the edge.

In the rule, the first edge uses the second predicate to specify employment of a member represented by "memberId," and the second edge uses the first predicate to specify employment at a company represented by "companyId." The third edge of the rule uses the third predicate to specify a "start" date of the employment, and the fourth edge of the rule uses the fourth predicate to specify an "end" date of the employment. All four edges share a common subject denoted by "e," which functions as a hub node that links the edges to form the compound relationship.

In another example, a compound relationship representing endorsement of a skill in an online professional network includes the following schema:

```
DefPred("endorser" , "1", "node", "0", "node").
DefPred("endorsee", "1", "node", "0", "node").
DefPred("skill", "1", "node", "0", "node").
Endorsements(h, Endorser, Endorsee, Skill) :-
    Edge(h, "endorser", Endorser),
    Edge(h, "endorsee", Endorsee),
    Edge(h, "skill", Skill).
```

In the above schema, the compound relationship is declared using the "@" symbol and specifies "Endorsement" as a compound type (i.e., data type) for the compound relationship. The compound relationship is represented by three predicates defined as "endorser," "endorsee," and "skill." The "endorser" predicate may represent a member making the endorsement, the "endorsee" predicate may represent a member receiving the endorsement, and the "skill" predicate may represent the skill for which the endorsement is given. The declaration is followed by a rule that maps the three predicates to three edges. The first edge uses the first predicate to identify the endorser as the value specified in an "Endorser" parameter, the second edge uses the second predicate to identify the endorsee as the value specified in an "Endorsee" parameter, and the third edge uses the third predicate to specify the skill as the value specified in a "Skill" parameter. All three edges share a common subject denoted by "h," which functions as a hub node that links the edges to form the compound relationship. Consequently, the schema may declare a ternary relationship for an "Endorsement" compound type, with the relationship defined by identity-giving attributes with types of "endorser," "endorsee," and "skill" and values attached to the corresponding predicates.

In one or more embodiments, compounds stored in graph database 200 model complex relationships (e.g., employment of a member at a position within a company) using a set of basic types (i.e., binary edges 318) in graph database 200. Each compound represents an n-ary relationship in graph 210, with each "component" of the relationship identified using the predicate and object (or subject) of an edge. A set of "n" edges that model the relationship are then linked to the compound using a common subject (or object) that is set to a hub node representing the compound. In turn, new compounds are subsequently dynamically added to graph database 200 without changing the basic types used in graph database 200, by specifying relationships that relate the compound structures to the basic types in schemas 306.

Graph 210 and schemas 306 are used to populate graph database 200 for processing queries 308 against the graph. In some embodiments, a representation of nodes 316, edges 318, and predicates 320 is obtained from source of truth 334 and stored in a log 312 in the graph database. Lock-free access to graph database 200 is implemented by appending changes to graph 210 to the end of the log instead of requiring modification of existing records in source of truth 334. In turn, graph database 200 provides an in-memory cache of log 312 and an index 314 for efficient and/or flexible querying of the graph.

In some embodiments, nodes 316, edges 318, and predicates 320 are stored as offsets in log 312. For example, the exemplary edge statement for creating a connection between two members named "Alice" and "Bob" may be stored in a binary log 312 using the following format:

| | |
|---|---|
| 256 | Alice |
| 261 | Bob |
| 264 | ConnectedTo |
| 275 | (256, 264, 261) |

In the above format, each entry in the log is prefaced by a numeric (e.g., integer) offset representing the number of bytes separating the entry from the beginning of the log. The first entry of "Alice" has an offset of 256, the second entry of "Bob" has an offset of 261, and the third entry of "ConnectedTo" has an offset of 264. The fourth entry has an offset of 275 and stores the connection between "Alice" and "Bob" as the offsets of the previous three entries in the order in which the corresponding fields are specified in the statement used to create the connection (i.e., Edge("Alice", "ConnectedTo", "Bob")).

Because the ordering of changes to graph 210 is preserved in log 312, offsets in log 312 can be used as representations of virtual time in graph 210. More specifically, each offset represents a different virtual time in graph 210, and changes in the log up to the offset are used to establish a state of graph 210 at the virtual time. For example, the sequence of changes from the beginning of log 312 up to a given offset that is greater than 0 are applied, in the order in which the changes were written, to construct a representation of graph 210 at the virtual time represented by the offset.

Graph database 200 further omits duplication of nodes 316, edges 318, and predicates 320 of graph 210 in log 312. Thus, a node, edge, predicate, and/or other element of graph 210 that has already been added to log 312 will not be rewritten at a subsequent point in log 312.

Graph database 200 also includes an in-memory index 314 that enables efficient lookup of edges 318 by subject, predicate, object, and/or other keys or parameters 310. In some embodiments, the index structure includes one or more hash maps and an edge store. The hash map(s) and edge store are accessed simultaneously by a number of processes, including a single write process and multiple read processes. Entries in each hash map are accessed using keys or parameters 310 such as subjects, predicates, objects, and/or other linkages that partially define edges in the graph. In turn, each entry in a hash map includes an offset into a one-linkage structure that stores one additional linkage that is used to resolve edges associated with the corresponding key or an offset into a two-linkage structure that stores two additional linkages that are used to resolve edges associated with the key. Edge store designs for graph database indexes are described in U.S. Patent Application Publication No. 2018-0144061-A1, entitled "Edge Store Designs for Graph Databases" and having filing date 23 Nov. 2016, which is incorporated herein by reference.

As shown in FIG. 3, a version-management apparatus 302 includes functionality to create and maintain multiple versions of graph database 200. The versions include a base version 328 of graph database 200 and a branched version 330 that is created from base version 328 at a given point in time. In some embodiments, base version 328 represents a "trunk" of graph database 200 that was created from an empty graph database 200, and branched version 330 represents a "child" of the trunk that is created as a copy of the trunk at a certain point in time. Alternatively, base version 328 represents a version of graph database 200 that is branched off the trunk and/or another previously created version of graph database 200, and branched version 330 represents a child of base version 328 that is created as a copy of base version 328 at a given point in time. When branched version 330 is created, a separate copy of log 312 and index 314 are created to store changes to graph 210 in branched version 330 separately from changes made to graph 210 in base version 328. Branching of graph databases is described in U.S. Patent Application Publication No. 2017-0212945-A1, entitled "Branchable Graph Databases" and having filing date 21 Jan. 2016, which is incorporated herein by reference.

In one or more embodiments, version-management apparatus 302 uses a set of operations 322 and data stored in base version 328 and branched version 330 to track relationships between nodes 316, edges 318, and predicates 320 stored in base version 328 and nodes 316, edges 318, and predicates 320 stored in branched version 330. First, version-management apparatus 302 stores, in branched version 330, base offsets 324 representing the virtual time at which branched version 330 was created from base version 328.

Base offsets 324 include a base offset in log 312 that represents the virtual time at which branched version 330 was created. For example, the base offset in log 312 of base version 328 is stored in a header of log 312 in branched version 330. As a result, data in log 312 of base version 328 up to the base offset can be read by branched version 330, and data in log 312 of branched version 330 is written to offsets that are after the base offset.

Base offsets 324 also include offsets in the edge store of index 314 in base version 328 representing the virtual time at which branched version 330 was created (e.g., the virtual time that includes changes made to graph database 200 up to the base offset in log 312). For example, the base offset of a one-linkage structure or two-linkage structure in index 314 of base version 328 is stored in the header of one or more portions of index 314 in branched version 330. As with the base offset in log 312, data in index 314 of base version 328, up to base offsets 324 of the edge store in base version 328, can be read by branched version 330. Similarly, data in index 314 of branched version 330 is written to edge store offsets that are after the corresponding base offsets 324.

To allow processing of queries 308 of branched version 330 using data up to base offsets 324 in base version 328, version-management apparatus 302 stores references 334 between edge store structures 314 in index 314 of branched version 330 and corresponding edge store structures in index 314 of base version 328. More specifically, when data is first written to a one-linkage structure, a two-linkage structure, or another type of edge store structure in index 314 of branched version 330, version-management apparatus 302 stores a reference from the structure to a corresponding structure in base version 328. For example, management apparatus 302 stores a reference (e.g., pointer, offset, etc.) to a "vlist" structure that stores values of one or more linkages related to a key in base version 328 in the header of a corresponding vlist structure that stores additional values of the linkage(s) related to the same key in branched version 330. In turn, a query that reads edges associated with the key in branched version 330 can use the reference to access additional edges associated with the key in the vlist structure of base version 328, up to a base offset in the vlist from which branched version 330 was created.

Version-management apparatus 302 also stores references 332-334 and reference types 336-338 that track transitions between "small" and "large" sets of edges in index 314 of both base version 328 and branched version 330. As described in U.S. Patent Application Publication No. 2018-0144061-A1, two-linkage structures in index 314 store small sets of edges for a given first linkage value, and one-linkage structures in index 314 store large sets of edges for a first linkage value by allowing the edge sets to be filtered by the first linkage value and a second linkage value. Thus, when the number of edges for a first linkage value transitions from small to big, storage of the edges in index 314 changes from a single two-linkage structure mapped to the first linkage value to multiple one-linkage structures mapped to the first linkage value and different second linkage values.

In one or more embodiments, version-management apparatus 302, graph database 200, and/or another component of the system write edges associated with a given key in branched version 330 to the same type of edge store structure as edges associated with the same key in base version 328. For example, the component identifies a newly written edge in log 312 of branched version 330 and uses the subject in the edge as a key to index 314 in branched version 330. If the key does not exist in branched version 330, the component searches index 314 in base version 328 for the key. If the key exists in base version 328 and maps to a two-linkage structure that stores a small set of edges for the key, the component creates a corresponding two-linkage structure in branched version 330, writes values of the two linkages in the edge to the two-linkage structure, and creates a mapping of the key to the two-linkage structure in a hash map in branched version 330. If the key exists in base version 328 and maps to one or more one-linkage structures that store a large set of edges for the key, the component creates a one-linkage structure in branched version 330, writes a value of the edge's third linkage to the one-linkage structure, and writes a value of the edge's second linkage to a separate one-linkage structure. The component then creates a mapping of the key and a second linkage in the edge to the one-linkage structure storing the third linkage value and a separate mapping of the key to the one-linkage structure storing the second linkage value. If the key does not exist in base version 328, the component creates a two-linkage structure in branched version 330, writes values of the two linkages in the edge to the two-linkage structure, and creates a mapping of the key to the two-linkage structure in a hash map in branched version 330.

On the other hand, a small set of edges in either base version 328 or branched version 330 can become a large set of edges as additional edges with the same key are added. When the transition from small to large occurs in base version 328 after branched version 330 is created from a virtual time in base version 328 that included a small set of edges for the key, version-management apparatus 302 performs one or more operations 322 that reorganize the edges in a two-linkage structure for the key into a one-linkage structure that stores values of the second linkage in the edges and additional one-linkage structures that store values of the third linkage for the key and second linkage value in the edges. Version-management apparatus 302 also creates, in one or more hash maps of base version 328, a mapping of the key to the one-linkage structure storing the second linkage values and a mapping of the key and each value of the second linkage to the one-linkage structure storing values of the third linkage associated with the key and second linkage value. Version-management apparatus 302 also stores a reference from the one-linkage structure that stores values of the second linkage for the edges to the two-linkage structure that stores the original small set of edges for the key. Version-management apparatus 302 further specifies, in one or more bits stored with the reference, a reference type that indicates that the reference is from a one-linkage structure for a large set of edges to a two-linkage structure for an older, smaller set of edges associated with the same key. As a result, a read of edges associated with the key in branched version 330 can use the mapping of the key to the one-linkage structure and the reference from the one-linkage structure to the two-linkage structure to access data that was written before the virtual time at which branched version 330 was created.

When the transition from a small set of edges for a key to a large set of edges for the key occurs in branched version 330 after branched version 330 is created from a virtual time in base version 328 that included a small set of edges for the key, version-management apparatus 302 performs one or more operations 322 that reorganize the edges in a two-linkage structure for the key in branched version 330 into a one-linkage structure that stores values of the second linkage in the edges and additional one-linkage structures that store values of the third linkage for the key and second linkage value in the edges. Version-management apparatus 302 also creates, in one or more hash maps of branched version 330, a mapping of the key to the one-linkage structure storing the second linkage values and a mapping of the key and each value of the second linkage to the one-linkage structure storing values of the third linkage associated with the key and second linkage value. Version-management apparatus 302 further copies values of the second linkage associated with the key from base version 328 to the one-linkage structure storing values of the second linkage in branched version 330 and copies values of the third linkage associated with the key and each second linkage value from base version 330 to the corresponding one-linkage structures in branched version 330. Version-management apparatus 302 then deletes a reference from the two-linkage structure for the key in branched version 330 to the two-linkage structure for the key in base version 328. As a result, a read of edges associated with the key in branched version 330 uses the one-linkage structures associated with the key in branched version 330 instead of reading from both branched version 330 and base version 328. Version-management apparatus 302 optionally creates a reference from the one-linkage structure that stores values of the second linkage in the edges in branched version 330 to the two-linkage structure for the older, smaller set of edges for the same key (e.g., in case the two-linkage structure needs to be accessed by another branched version that is created off branched version 330).

Figure 4A:
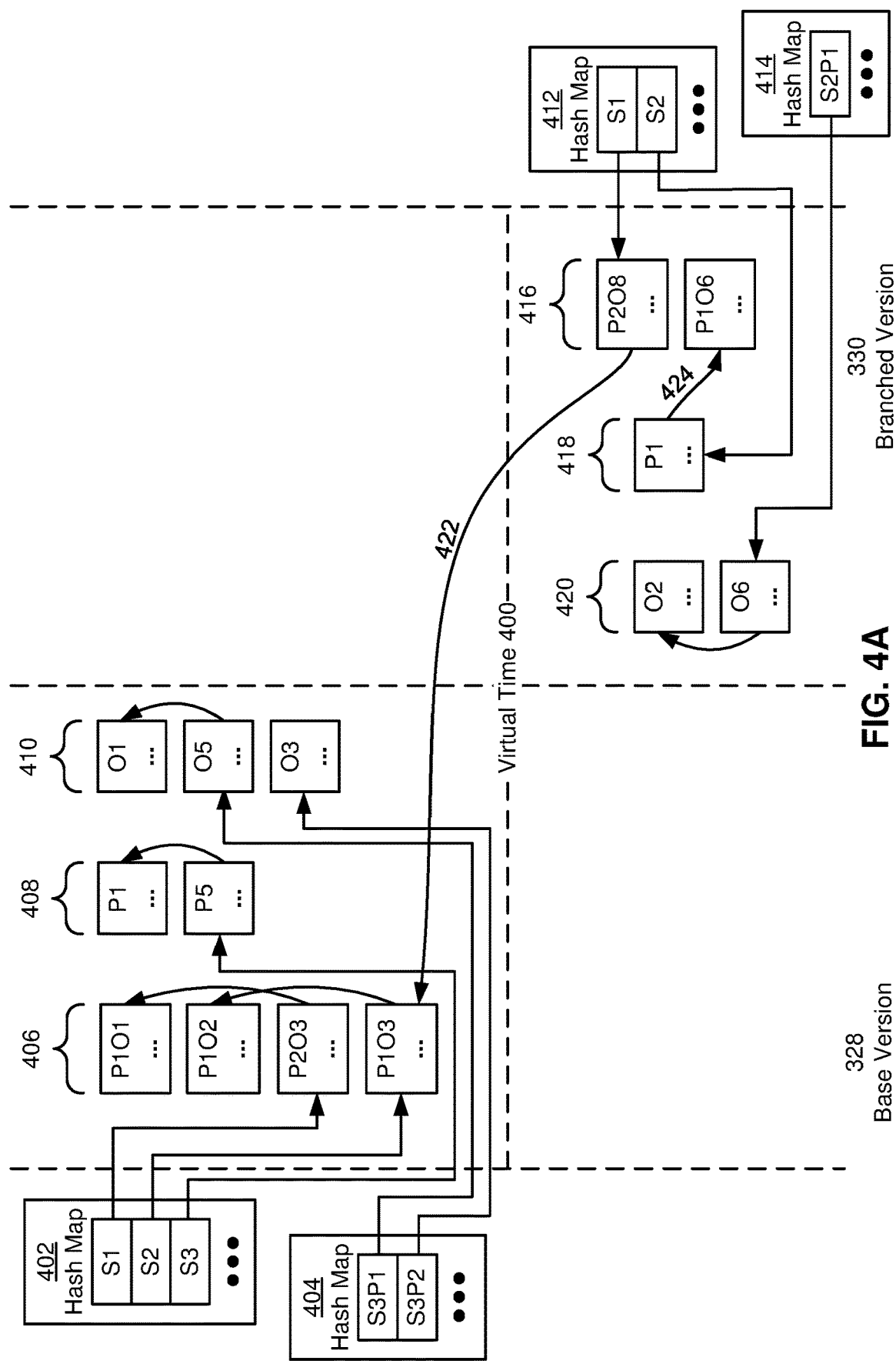
FIG. 4A shows an example base version and branched version of a graph database in accordance with the disclosed embodiments.
Figure 4B:
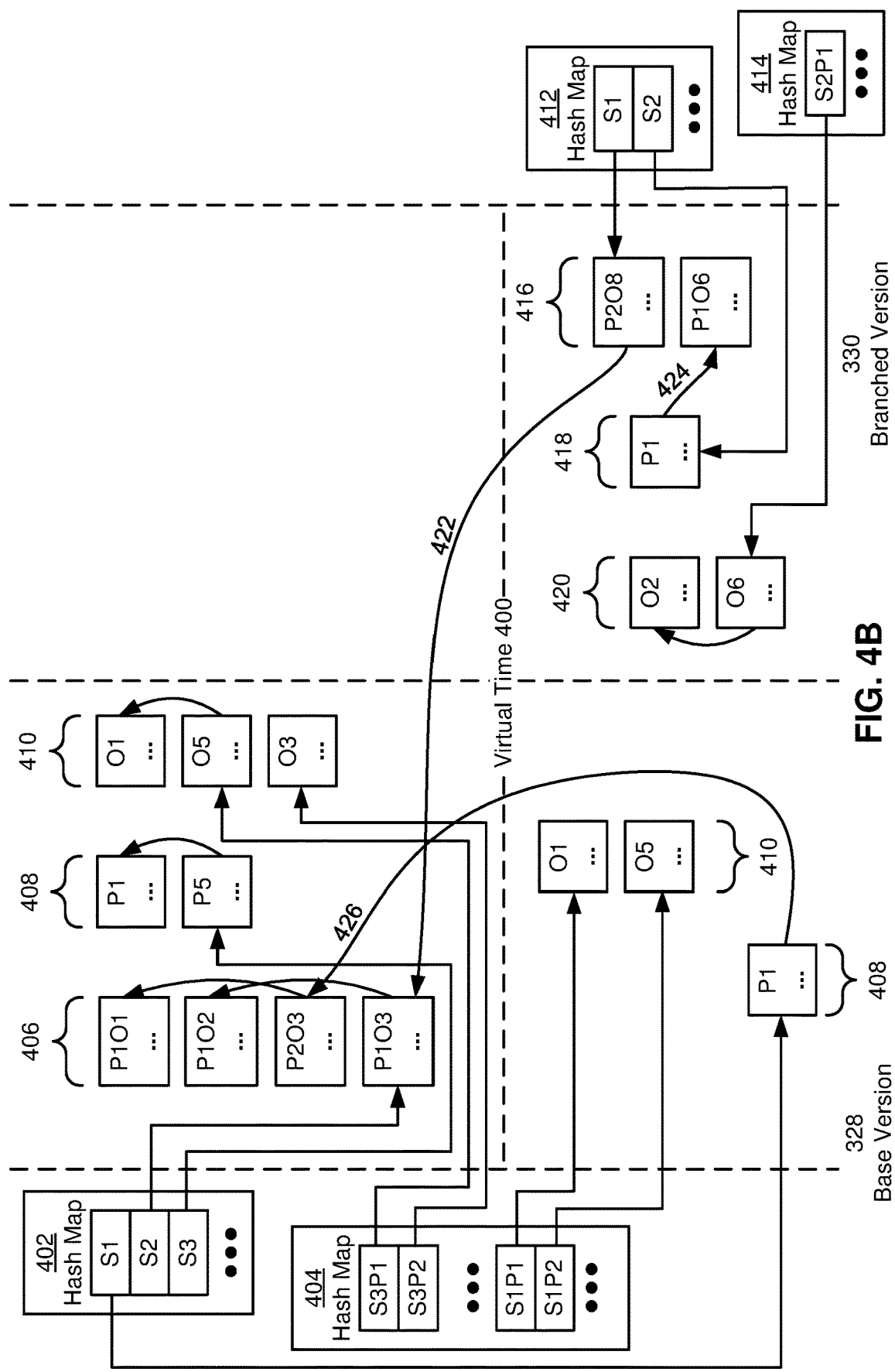
FIG. 4B shows an example base version and branched version of a graph database in accordance with the disclosed embodiments.

The operation of version-management apparatus is illustrated using the example base version 328 and branched version 330 of index 314 in FIGS. 4A-4B. As shown in FIG. 4A, base version 328 includes a hash map 402 that is used to perform lookups of edges by subject (e.g., "S1," "S2," "S3"). Base version 328 also includes a hash map 404 that is used to perform lookups of edges by subject and predicate (e.g.., "S3P1," "S3P2"). As a result, hash map 402 indexes one linkage in edges of base version 328, and hash map 402 indexes two linkages in edges of base version 320.

The first two entries of hash map 402 (i.e., "S1" and "S2") map to two different vlists in two-linkage structures 406 in an edge store in base version 328. Each vlist contains a linked list of arrays. Within the vlist, a newly allocated page is stored in an array that is double and/or another multiple of the size of the previous page, and the header and/or beginning of the page may point to the end of the previous page. In turn, each vlist in two-linkage structures 406 stores values of the two remaining linkages (i.e., predicate and object) in a small set of edges containing the first linkage value in the corresponding hash map 402 entry.

The third entry of hash map 402 (i.e., "S3") maps to a vlist in one-linkage structures 408 in the edge store of base version 328. The vlist stores values of a second linkage in a large set of edges containing the first linkage value represented by the third entry of hash map 402. As a result, the vlist is used to partially materialize or resolve edges containing the first linkage value after the number of edges grows from small to large. More specifically, a lookup of the first linkage value in hash map 402 is used to obtain a mapping to the corresponding vlist in one-linkage structure 408 and materialize one or more second linkage values in edges with the first linkage value. The first and second linkage values are then used as keys to hash map 404 (e.g., "S3P1," "S3P2"), and mappings of the keys to two different vlists in a separate set of one-linkage structures 410 in the edge store of base version 328 are used to materialize third linkage values in edges containing the first and second linkage values.

Branched version 330 is created from base version 328 at a virtual time 400 represented by a set of offsets in the vlists of two-linkage structures 406 and one-linkage structures 408-410. Branched version 330 includes a hash map 412 that, like hash map 402 in base version 328, is used to perform lookups of edges by subject (e.g., "S1," "S2"). Branched version 330 also includes a hash map 414 that, like hash map 404 in base version 328, is used to perform lookups of edges by subject and predicate (e.g., "S2P1"). Each entry in hash maps 412-414 indicates the addition or modification of edges containing the corresponding key in branched version 330.

The first entry of hash map 412 (i.e., "S1") maps to a vlist in a set of two-linkage structures 416 in the edge store of branched version 330. The vlist stores values of two remaining linkages in a small set of edges containing the first linkage value represented by the first entry of hash map 412. The vlist also includes a reference 422 to a corresponding vlist for the first linkage value in base version 328. As a result, a read of edges containing the first linkage value from branched version 330 is performed by using the vlist in two-linkage structures 416 to materialize edges containing the first linkage that have been written to branched version 330, using reference 422 to reach the corresponding vlist in base version 328, and materializing additional edges containing the first linkage that have been written to branched version 330, up to the offset representing virtual time 400.

The second entry of hash map 412 (i.e., "S2") maps to a vlist in a set of one-linkage structures 418 in the edge store of branched version 330. Like one-linkage structures 408 in base version 328, the vlist in one-linkage structures 418 stores values of a second linkage in a large set of edges containing the first linkage value represented by the second entry of hash map 412. As a result, the vlist is used to identify values of the second linkage in edges containing the first linkage value. The first and second linkage values are then used as one or more keys to hash map 414 (e.g., "S2P1"), and a mapping of each key to a vlist in a separate set of one-linkage structures 420 in the edge store of branched version 338 is used to materialize third linkage values in edges containing the first and second linkage values.

Because the subject of "S2" in branched version includes one or more entries in hash map 414 that map to one or more vlists in one-linkage structures 420, the number of edges containing the subject in branched version 330 has transitioned from small to large. On the other hand, base version 328 still contains a small set of edges for the same subject, which is stored in a vlist in two-linkage structures 406 that is reached via an entry in hash map 402. To reconcile the difference in structures used to store edges for the subject in base version 328 and branched version 330, values of the second linkage in edges with the subject are copied from two-linkage structures 406 and 416 to the vlist in one-linkage structures 418, and values of the third linkage in the edges with the subject are copied from two-linkage structures 406 and 416 to the vlist in one-linkage structures 420. A reference 424 from the vlist in one-linkage structures 418 to a vlist in two-linkage structures 416 that stores the older, small set of edges containing the subject is created to allow access to the small set of edges and/or offsets associated with the small set of edges in two-linkage structures 416.

As shown in FIG. 4B, base version 328 is also updated after virtual time 400. In particular, edges with the subject of "S1" have been added to base version 328, causing the number of edges containing the subject to transition from small to large. As a result, the first entry in hash map 402 maps from the subject to a new vlist in one-linkage structures 408, which is created after virtual time 400 and stores values of a second linkage in a large set of edges containing the subject. The subject and second linkage values are additionally stored in hash map 404, and mappings from the subject and second linkage values in hash map 404 to vlists created after virtual time 400 in one-linkage structures 410 are used to fully resolve the edges.

To allow reads of edges containing the subject in branched version 330 to access data that was written to base version 328 before virtual time 400, the vlist in one-linkage structures 408 to which the first entry of hash map 402 is mapped includes a reference 426 to an older vlist for the same subject in one-linkage structures 408. After using the first entry in hash map 402 and reference 426 to access the older vlist, the reads can scan the older vlist until an offset representing virtual time 400 is reached. The reads can then retrieve additional edges containing the subject from the offset and older offsets in the vlist.

As a result, branched versions of the graph database represent variants or alternative versions of the graph that can be created, modified, and/or deleted without affecting the corresponding base versions. In turn, the branched versions can be used to perform and validate writes to the graph database before merging the writes into the base version, which improves the integrity of data in the graph database and allows the validated writes to be applied in an atomic and consistent manner The branched versions can also be used to test changes to the data, schema, and/or querying of the graph database without modifying a source of truth for the graph in the base versions, which reduces risk, the potential for errors or failures, and/or processing overhead associated with conventional techniques that deploy changes to the schema, data, and/or querying in databases without testing or validating the changes first. Moreover, storing a single copy of data in a base version and using the data to perform reads of a version that is branched off the base version reduces the use of storage and/or memory resources in the graph database. Consequently, the disclosed embodiments provide technological improvements in applications, tools, computer systems, and/or environments for storing, querying, duplicating, testing, validating, creating, and/or modifying data and/or databases.

Those skilled in the art will appreciate that the system of FIG. 3 may be implemented in a variety of ways. First, version-management apparatus 302, graph database 200, and/or source of truth 334 may be provided by a single physical machine, multiple computer systems, one or more virtual machines, a grid, one or more databases, one or more filesystems, and/or a cloud computing system. Version-management apparatus 302, graph database 200, and/or source of truth 334 may additionally be implemented together and/or separately by one or more hardware and/or software components and/or layers. For example, version-management apparatus 302 may be implemented as a process or module that operates within and/or with graph database 200 and/or using one or more APIs for accessing graph database 200.

Second, the functionality of the system may be used with other types of databases and/or data. For example, version-management apparatus 302 may support branching and/or versioning of relational databases, distributed streaming platforms, flat files, distributed filesystems, images, audio, video, and/or other types of data.

Figure 5:
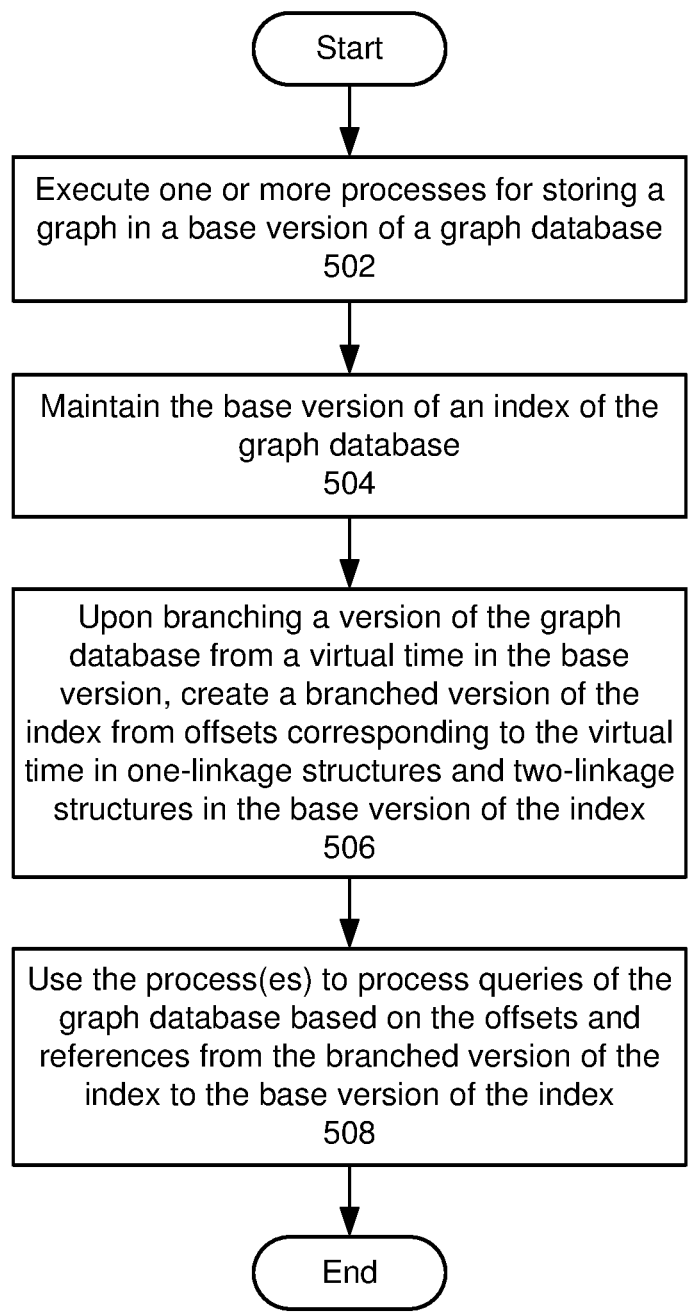
FIG. 5 shows a flowchart illustrating a process of providing a graph database storing a graph in accordance with the disclosed embodiments.

FIG. 5 shows a flowchart illustrating a process of providing a graph database storing a graph in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, one or more processes for storing a graph in a base version of a graph database are executed (operation 502) and used to maintain the base version of an index of the graph database (operation 504). For example, the process(es) include a single write process and multiple read processes. The graph includes a set of edges defined by a first linkage, a second linkage, and a third linkage (e.g., a subject, predicate, and object), which are stored in a log-based representation of the graph database. The index includes an edge store containing a first one-linkage structure storing values of the third linkage, a second one-linkage structure storing values of the second linkage, and a two-linkage structure storing values of the second and third linkages. The index also, or instead, includes a first hash map storing mappings from values of the first linkage to the two-linkage structure and the second one-linkage structure. The index also, or instead, includes a second hash map storing mappings from values of the first and second linkages to the first one-linkage structure.

Upon branching a version of the graph database from a virtual time in the base version, a branched version of the index is created from offsets corresponding to the virtual time in one-linkage structures and two-linkage structures in the base version of the index (operation 506). For example, a base offset of the log is stored as the virtual time at which the branched version was created from the base version. Similarly, offsets of each one-linkage structures and two-linkage structure in the base version that reflect changes up to the base offset in the log are stored as a representation of the virtual time in the index. Changes to the base version are written to offsets after the virtual time in the log and index of the base version, and changes to the branched version are written to offsets after the virtual time in the log and index of the branched version.

Finally, the process(es) are used to process queries of the graph database based on the offsets and references from the branched version of the index to the base version of the index (operation 508). For example, a read process performs a read of edges containing a first linkage value in the branched version by retrieving a first offset into the branched version of the edge store from a mapping of the first linkage value in a hash map, reading a first subset of edges containing the first linkage value from the branched version, accessing the base version of the edge store using a reference from the branched version to the base version, and reading a second subset of edges containing the first linkage value from the base version.

In another example, the write process performs a write of an edge containing values of the first and second linkages that map to the first one-linkage structure of the base version by writing a value of the third linkage in the edge to the first one-linkage structure of the branched version, storing a first reference from the first one-linkage structure of the branched version to the first one-linkage structure in the base version that corresponds to the virtual time, and mapping the values of the first and second linkages in the second hash map of the branched version to the first one-linkage structure of the branched version. As a result, the write process writes the edge as a part of a large set of edges in the branched version because the branched version was created from the base version that contained a large set of edges with the same first linkage value.

In a third example, the process(es) handle an increase in the number of edges with a given first linkage value in the branched version after the branched version is created from a virtual time in the base version that contained a small set of edges with the first linkage value, as described in further detail below with respect to FIG. 6.

In a fourth example, the process(es) handle an increase in the number of edges with a given first linkage value in the base version after the branched version is created from a virtual time in the base version that contained a small set of edges with the first linkage value, as described in further detail below with respect to FIG. 7.

Figure 6:
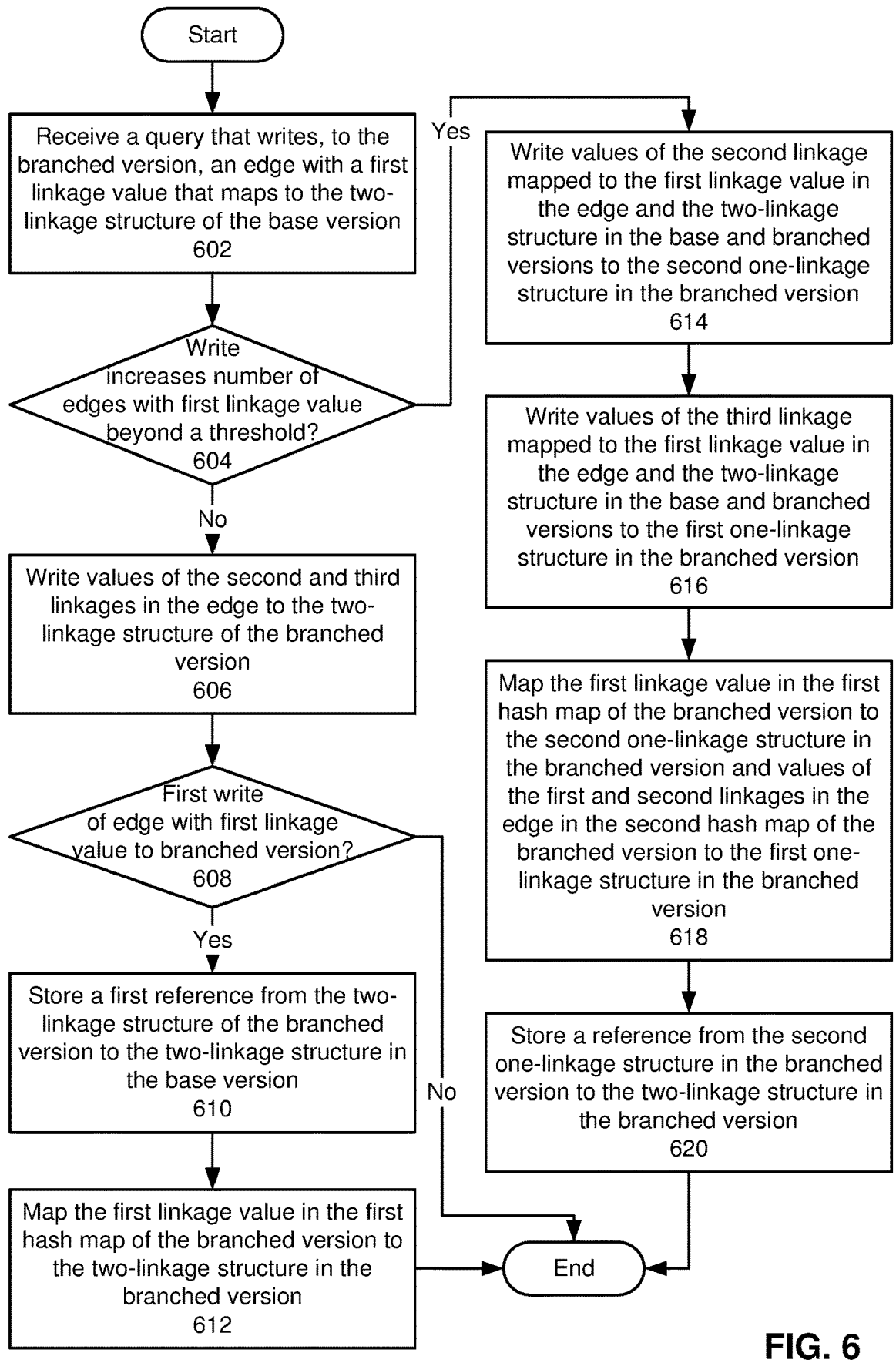
FIG. 6 shows a flowchart illustrating the processing of queries of a graph database in accordance with the disclosed embodiments.

FIG. 6 shows a flowchart illustrating the processing of queries of a graph database in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, a query that writes, to the branched version of the graph database, a first edge containing a first linkage value that maps to the two-linkage structure of the base version of the graph database is received (operation 602). The query is processed based on a comparison of the number of edges with the first linkage value after the write is made with a threshold (operation 604). If the write does not increase the number of edges with the first linkage value beyond the threshold (e.g., a threshold between a "small" set of edges and a "big" set of edges), values of the second and third linkages in the first edge are written to the two-linkage structure of the branched version (operation 606).

Subsequent processing of the query is dependent on whether the query is the first write of the edge with the first linkage value to the branched version (operation 608). If the query is used to write the first new edge with the first linkage value to the branched version (e.g., after the branched version is created from a virtual time in the base version that contained a small set of edges with the first linkage value), a reference from the two-linkage structure of the branched version to the two-linkage structure in the base version is stored (operation 610), and the first linkage value in the first hash map of the branched version is mapped to the two-linkage structure in the branched version (operation 612).

If the query writes an edge that increases the number of edges with the first linkage value in the branched version beyond the threshold, values of the second linkage mapped to the first linkage value in the edge and the two-linkage structure in the base and branched versions are written to the second one-linkage structure in the branched version (operation 612), and values of the third linkage mapped to the first linkage value in the edge and the two-linkage structure in the base and branched versions are written to the first one-linkage structure in the branched version (operation 614). In other words, the second and third linkage values for the edges are written to structures in the branched version of the edge store that improve lookup of the large number of edges with the first linkage value.

The first linkage value is mapped in the first hash map of the branched version to the second one-linkage structure in the branched version, and values of the first and second linkages in the edge are mapped in the second hash map of the branched version to the first one-linkage structure in the branched version (operation 616). The mapping from the first hash map to the second one-linkage structure allows edges with the first linkage value to be partially materialized into one or more second linkage values. In turn, the first and second linkage values can be used to retrieve corresponding mappings in the second hash map, which lead to one-linkage structures that store third linkage values in the corresponding edges.

Finally, a reference from the second one-linkage structure in the branched version to the two-linkage structure in the branched version is stored (operation 618). The reference allows the older, small set of edges with the first linkage value to be accessed from the first linkage value in the first hash map.

Figure 7:
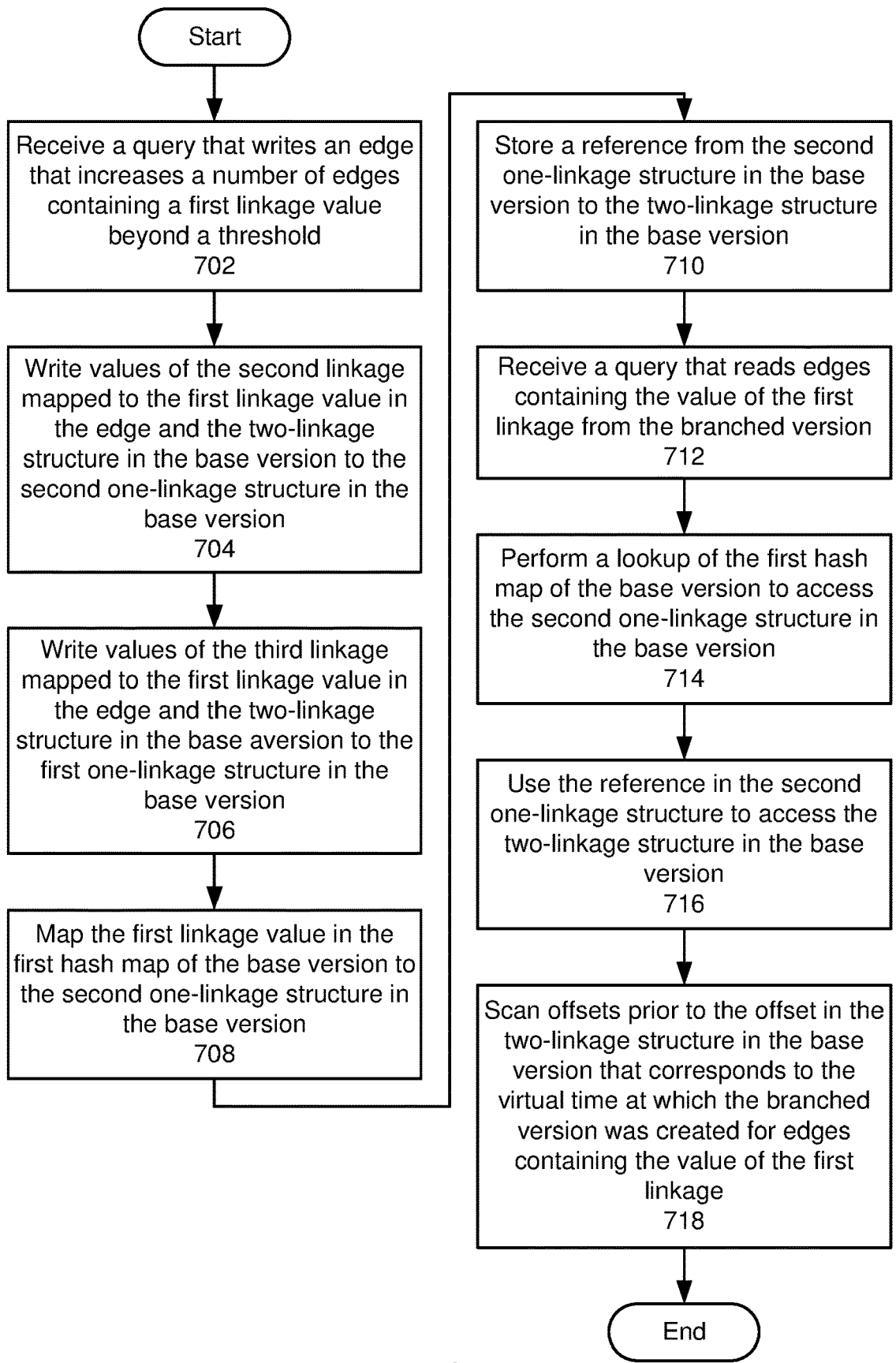
FIG. 7 shows a flowchart illustrating the processing of queries of a graph database in accordance with the disclosed embodiments.

FIG. 7 shows a flowchart illustrating the processing of queries of a graph database in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

Initially, a query that writes an edge that increases the number of edges with a first linkage value in the base version of the graph database beyond a threshold is received (operation 702). For example, the write of the second edge changes the number of edges with the first linkage value from small to large.

Next, values of the second linkage mapped to the first linkage value in the edge and the two-linkage structure in the base version are written to the second one-linkage structure in the base version (operation 704), and values of the third linkage mapped to the first linkage value in the edge and the two-linkage structure in the base version are written to the first one-linkage structure in the base version (operation 706). In other words, the second and third linkage values for the edges are written to structures in the edge store that improve lookup of the large number of edges with the first linkage value.

The first linkage value is then mapped in the first hash map of the base version to the second one-linkage structure in the base version (operation 708). The mapping from the first hash map to the second one-linkage structure allows edges with the first linkage value to be partially materialized into one or more second linkage values. A reference from the second one-linkage structure in the base version to the two-linkage structure in the base version is also stored (operation 710).

A query that reads edges containing the value of the first linkage from the branched version is subsequently received (operation 712). To process the query using data from the base version, a lookup of the first hash map of the base version is performed to access the second one-linkage structure in the base version (operation 714), and the reference in the second one-linkage structure is used to access the two-linkage structure in the base version (operation 716). Offsets prior to the offset in the two-linkage structure in the base version that corresponds to the virtual time at which the branched version was created are then scanned for edges containing the value of the first linkage (operation 718). As a result, the query is processed in a way that avoids reading edges written to the base version after the branched version is created.

Figure 8:
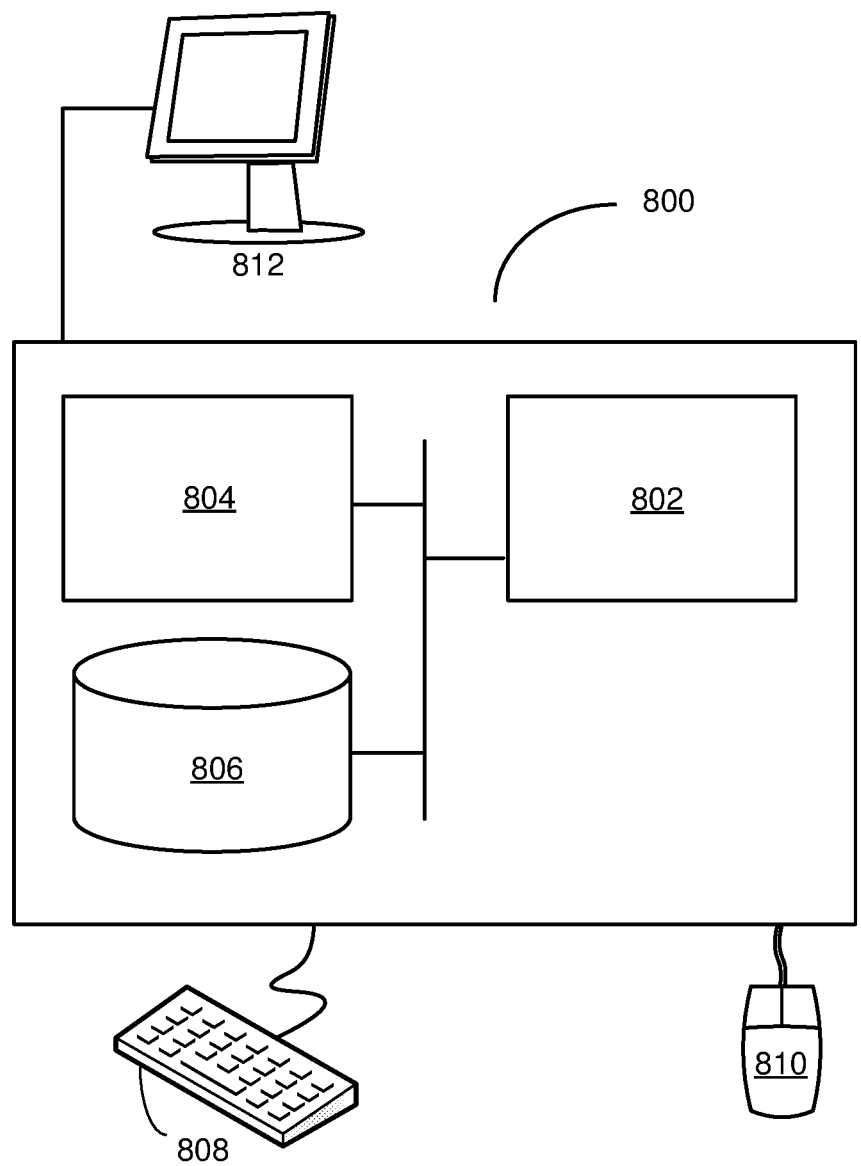
FIG. 8 shows a computer system in accordance with the disclosed embodiments.

FIG. 8 shows a computer system in accordance with the disclosed embodiments. Computer system 800 includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for providing a graph database. The system includes a set of processes, which may include a single write process and multiple read processes. The processes maintain the base version of an index of the graph database. Upon branching a version of the graph database from a first offset representing a virtual time in the base version of the graph database, the processes create a branched version of the index from a second offset corresponding to the virtual time in the base version of the index. The processes then process queries of the graph database based on the offsets and references from the branched version of the index to the base version of the index.

In addition, one or more components of computer system 800 may be remotely located and connected to the other components over a network. Portions of the present embodiments (e.g., version-management apparatus, graph database, source of truth, processes, etc.) may also be located on different nodes of a distributed system that implements the embodiments. For example, the present embodiments may be implemented using a cloud computing system that manages and/or maintains branched and base versions of a remote graph database.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   executing one or more processes for storing a graph in a base version of a graph database, wherein the graph comprises a set of edges defined by a first linkage, a second linkage, and a third linkage;

maintaining, by the one or more processes, a base version of an index of the graph database, wherein the index comprises:

an edge store comprising a first one-linkage structure storing values of the third linkage, a second one-linkage structure storing values of the second linkage, and a two-linkage structure storing values of the second and third linkages;

a first hash map storing mappings from values of the first linkage to the two-linkage structure and the second one-linkage structure; and a second hash map storing mappings from the values of the first and second linkages to the first one-linkage structure;

upon branching a version of the graph database from a virtual time in the base version of the graph database, creating, by the one or more processes, a branched version of the index from offsets corresponding to the virtual time in the first and second one-linkage structures and the two-linkage structure in the base version of the index; and using the one or more processes to process queries of the graph database based on the offsets and references from the branched version of the index to the base version of the index, wherein using the one or more processes to process the queries of the graph database comprises:

when the queries include a first query of the branched version that comprises a write of a first edge comprising a value of the first linkage that maps to the two-linkage structure of the base version:

writing values of the second and third linkages in the first edge to the two-linkage structure of the branched version; and storing a first reference from the two-linkage structure of the branched version to the two-linkage structure in the base version.

2. The method of claim 1, wherein using the one or more processes to process the queries of the graph database further comprises:

mapping the value of the first linkage in the first hash map of the branched version to the two-linkage structure in the branched version.

3. The method of claim 1, wherein using the one or more processes to process the queries of the graph database further comprises:

when the queries include a second query of the branched version that comprises a write of a second edge that increases a number of edges comprising the value of the first linkage in the branched version beyond a threshold:

writing values of the second linkage mapped to the value of the first linkage in the second edge and the two-linkage structure in the base version and the branched version to the second one-linkage structure in the branched version;

writing values of the third linkage mapped to the value of the first linkage in the second edge and the two-linkage structure in the base version and the branched version to the first one-linkage structure in the branched version; and mapping the value of the first linkage in the first hash map of the branched version to the second one-linkage structure in the branched version.

4. The method of claim 3, wherein using the one or more processes to process the queries of the graph database further comprises:

storing a second reference from the second one-linkage structure in the branched version to the two-linkage structure in the branched version.

5. The method of claim 3, wherein using the one or more processes to process the queries of the graph database further comprises:

mapping the value of the first linkage and a value of the second linkage in the second edge in the second hash map of the branched version to the first one-linkage structure in the branched version.

6. A method, comprising:

executing one or more processes for storing a graph in a base version of a graph database, wherein the graph comprises a set of edges defined by a first linkage, a second linkage, and a third linkage;

maintaining, by the one or more processes, a base version of an index of the graph database, wherein the index comprises:

an edge store comprising a first one-linkage structure storing values of the third linkage, a second one-linkage structure storing values of the second linkage, and a two-linkage structure storing values of the second and third linkages;

a first hash map storing mappings from values of the first linkage to the two-linkage structure and the second one-linkage structure; and a second hash map storing mappings from the values of the first and second linkages to the first one-linkage structure;

upon branching a version of the graph database from a virtual time in the base version of the graph database, creating, by the one or more processes, a branched version of the index from offsets corresponding to the virtual time in the first and second one-linkage structures and the two-linkage structure in the base version of the index; and using the one or more processes to process queries of the graph database based on the offsets and references from the branched version of the index to the base version of the index, wherein using the one or more processes to process the queries of the graph database comprises:

when the queries include a first query of the base version that comprises a write of an edge that increases a number of edges comprising a value of the first linkage in the base version beyond a threshold:

writing values of the second linkage mapped to the value of the first linkage in the edge and the two-linkage structure in the base version to the second one-linkage structure in the base version;

writing values of the third linkage mapped to the value of the first linkage in the edge and the two-linkage structure in the base version to the first one-linkage structure in the base version;

mapping the value of the first linkage in the first hash map of the base version to the second one-linkage structure in the base version; and storing a reference from the second one-linkage structure in the base version to the two-linkage structure in the base version.

7. The method of claim 6, wherein using the one or more processes to process the queries of the graph database further comprises:

when the queries include a second query of the branched version that comprises a read of edges comprising the value of the first linkage:
  performing a lookup of the first hash map of the base version to access the second one-linkage structure in the base version;
  using the reference in the second one-linkage structure to access the two-linkage structure in the base version; and
  scanning offsets prior to an offset of the two-linkage structure in the base version that corresponds to the virtual time for the edges comprising the value of the first linkage.

8. A method, comprising:
executing one or more processes for storing a graph in a base version of a graph database, wherein the graph comprises a set of edges defined by a first linkage, a second linkage, and a third linkage;
maintaining, by the one or more processes, a base version of an index of the graph database, wherein the index comprises:
  an edge store comprising a first one-linkage structure storing values of the third linkage, a second one-linkage structure storing values of the second linkage, and a two-linkage structure storing values of the second and third linkages;
  a first hash map storing mappings from values of the first linkage to the two-linkage structure and the second one-linkage structure; and
  a second hash map storing mappings from the values of the first and second linkages to the first one-linkage structure;
upon branching a version of the graph database from a virtual time in the base version of the graph database, creating, by the one or more processes, a branched version of the index from offsets corresponding to the virtual time in the first and second one-linkage structures and the two-linkage structure in the base version of the index; and
using the one or more processes to process queries of the graph database based on the offsets and references from the branched version of the index to the base version of the index, wherein using the one or more processes to process the queries of the graph database comprises:
  when the queries include a first query of the branched version that comprises a write of an edge comprising values of the first and second linkages that map to the first one-linkage structure of the base version:
    writing a value of the third linkage in the edge to the first one-linkage structure of the branched version; and
    storing a first reference from the first one-linkage structure of the branched version to the first one-linkage structure in the base version that corresponds to the virtual time.

9. The method of claim 8, wherein using the one or more processes to process the queries of the graph database further comprises:
  mapping the values of the first and second linkages in the second hash map of the branched version to the first one-linkage structure of the branched version.

10. A method, comprising:
executing one or more processes for storing a graph in a base version of a graph database, wherein the graph comprises a set of edges defined by a first linkage, a second linkage, and a third linkage;
maintaining, by the one or more processes, a base version of an index of the graph database, wherein the index comprises:
  an edge store comprising a first one-linkage structure storing values of the third linkage, a second one-linkage structure storing values of the second linkage, and a two-linkage structure storing values of the second and third linkages;
  a first hash map storing mappings from values of the first linkage to the two-linkage structure and the second one-linkage structure; and
  a second hash map storing mappings from the values of the first and second linkages to the first one-linkage structure;
upon branching a version of the graph database from a virtual time in the base version of the graph database, creating, by the one or more processes, a branched version of the index from offsets corresponding to the virtual time in the first and second one-linkage structures and the two-linkage structure in the base version of the index; and
using the one or more processes to process queries of the graph database based on the offsets and references from the branched version of the index to the base version of the index, wherein using the one or more processes to process the queries of the graph database comprises:
  when the queries include a query of the branched version that comprises a read of edges comprising a value of the first linkage:
    retrieving a first offset into the branched version of the edge store from a mapping of the value of the first linkage in the first or second hash maps;
    reading a first subset of edges comprising the value of the first linkage from the branched version;
    accessing the base version of the edge store based on a reference from the branched version to the base version; and
    reading a second subset of edges comprising the value of the first linkage from the base version.

11. The method of claim 1, wherein the first, second, and third linkages comprise:
  a subject;
  a predicate; and
  an object.

12. A system, comprising:
one or more processors; and
memory storing instructions that, when executed by the one or more processors, cause the system to:
  store a graph in a base version of a graph database, wherein the graph comprises a set of edges defined by a first linkage, a second linkage, and a third linkage;
  maintain a base version of an index of the graph database, wherein the index comprises:
    an edge store comprising a first one-linkage structure storing values of the third linkage, a second one-linkage structure storing values of the second linkage, and a two-linkage structure storing values of the second and third linkages;
    a first hash map storing mappings from values of the first linkage to the two-linkage structure and the second one-linkage structure; and
    a second hash map storing mappings from values of the first and second linkages to the first one-linkage structure;
  upon branching a version of the graph database from a virtual time in the base version of the graph database, create a branched version of the index from offsets corresponding to the virtual time in the first and second one-linkage structures and the two-linkage structure in the base version of the index; and process queries of the graph database based on the offsets and references from the branched version of the index to the base version of the index, wherein processing the queries of the graph database comprises:

when the queries include a first query of the branched version that comprises a write of a first edge comprising a value of the first linkage that maps to the two-linkage structure of the base version:

writing values of the second and third linkages in the first edge to the two-linkage structure of the branched version;

storing a first reference from the two-linkage structure of the branched version to the two-linkage structure in the base version; and mapping the value of the first linkage in the first hash map of the branched version to the two-linkage structure in the branched version.

13. The system of claim 12, wherein processing the queries of the graph database further comprises:

when the queries include a second query of the branched version that comprises a write of a second edge that increases a number of edges comprising the value of the first linkage in the branched version beyond a threshold:

writing values of the second linkage mapped to the value of the first linkage in the second edge and the two-linkage structure in the base version and the branched version to the second one-linkage structure in the branched version;

writing values of the third linkage mapped to the value of the first linkage in the second edge and the two-linkage structure in the base version and the branched version to the first one-linkage structure in the branched version; and mapping the value of the first linkage in the first hash map of the branched version to the second one-linkage structure in the branched version.

14. The system of claim 13, wherein processing the queries of the graph database further comprises:

storing a second reference from the second one-linkage structure in the branched version to the two-linkage structure in the branched version; and mapping the value of the first linkage and a value of the second linkage in the second edge in the second hash map of the branched version to the first one-linkage structure in the branched version.

15. A system, comprising:

one or more processors; and memory storing instructions that, when executed by the one or more processors, cause the system to:

store a graph in a base version of a graph database, wherein the graph comprises a set of edges defined by a first linkage, a second linkage, and a third linkage;

maintain a base version of an index of the graph database, wherein the index comprises:

an edge store comprising a first one-linkage structure storing values of the third linkage, a second one-linkage structure storing values of the second linkage, and a two-linkage structure storing values of the second and third linkages;

a first hash map storing mappings from values of the first linkage to the two-linkage structure and the second one-linkage structure; and a second hash map storing mappings from values of the first and second linkages to the first one-linkage structure;

upon branching a version of the graph database from a virtual time in the base version of the graph database, create a branched version of the index from offsets corresponding to the virtual time in the first and second one-linkage structures and the two-linkage structure in the base version of the index; and process queries of the graph database based on the offsets and references from the branched version of the index to the base version of the index, wherein processing the queries of the graph database comprises:

when the queries include a first query of the base version that comprises a write of an edge that increases a number of edges comprising a value of the first linkage in the base version beyond a threshold:

writing values of the second linkage mapped to the value of the first linkage in the edge and the two-linkage structure in the base version to the second one-linkage structure in the base version;

writing values of the third linkage mapped to the value of the first linkage in the edge and the two-linkage structure in the base version to the first one-linkage structure in the base version;

mapping the value of the first linkage in the first hash map of the base version to the second one-linkage structure in the base version; and storing a reference from the second one-linkage structure in the base version to the two-linkage structure in the base version.

16. The system of claim 15, wherein processing the queries of the graph database further comprises:

when the queries include a second query of the branched version that comprises a read of edges comprising the value of the first linkage:

performing a lookup of the first hash map of the base version to access the second one-linkage structure in the base version;

using the reference in the second one-linkage structure to access the two-linkage structure in the base version; and scanning offsets prior to an offset of the two-linkage structure in the base version that corresponds to the virtual time for the edges comprising the value of the first linkage.

17. The system of claim 12, wherein the first, second, and third linkages comprise:

a subject;
a predicate; and
an object.

18. The method of claim 6, wherein the first, second, and third linkages comprise:

a subject;
a predicate; and
an object.

19. The method of claim 8, wherein the first, second, and third linkages comprise:

a subject;
a predicate; and
an object.

20. The method of claim 10, wherein the first, second, and third linkages comprise:
   a subject;
   a predicate; and
   an object.

21. The system of claim 15, wherein the first, second, and third linkages comprise:
   a subject;
   a predicate; and
   an object.

* * * * *